(12) United States Patent
Robinson et al.

(10) Patent No.: US 8,639,092 B2
(45) Date of Patent: Jan. 28, 2014

(54) AUDIO COPY PROTECTION SYSTEM

(75) Inventors: David John Michael Robinson, Hertfordshire (GB); Baolin Tan, Hertfordshire (GB)

(73) Assignee: DCS Copy Protection Limited, West Yorkshire (GB)

( * ) Notice: Subject to any disclaimer, the term of this patent is extended or adjusted under 35 U.S.C. 154(b) by 0 days.

(21) Appl. No.: 13/448,142

(22) Filed: Apr. 16, 2012

(65) Prior Publication Data

US 2012/0294588 A1  Nov. 22, 2012

Related U.S. Application Data

(63) Continuation of application No. 11/665,508, filed on Apr. 13, 2007, now Pat. No. 8,160,423.

(30) Foreign Application Priority Data

Oct. 13, 2004 (GB) .................................. 0422743.5

(51) Int. Cl.
 *H04N 9/80* (2006.01)
(52) U.S. Cl.
 USPC ........................................................ 386/252
(58) Field of Classification Search
 USPC ............................................... 386/200, 252
 See application file for complete search history.

(56) References Cited

U.S. PATENT DOCUMENTS

| | | | |
|---|---|---|---|
| 4,086,634 A | 4/1978 | Cook | |
| 4,100,575 A | 7/1978 | Morio et al. | |
| 4,163,253 A | 7/1979 | Morio et al. | |
| 4,571,642 A | 2/1986 | Hofstein | |
| 4,577,216 A | 3/1986 | Ryan | |
| 4,626,890 A | 12/1986 | Ryan | |
| 4,631,603 A | 12/1986 | Ryan | |
| 4,644,422 A | 2/1987 | Bedini | |
| 4,695,901 A | 9/1987 | Ryan | |
| 4,802,212 A | 1/1989 | Freeman et al. | |
| 4,819,098 A | 4/1989 | Ryan | |
| 4,888,649 A | 12/1989 | Kagota | |
| 5,073,925 A | 12/1991 | Nagata et al. | |
| 5,155,767 A | 10/1992 | Noller et al. | |

(Continued)

FOREIGN PATENT DOCUMENTS

| | | |
|---|---|---|
| DE | 3806411 | 9/1989 |
| EP | 0372601 | 6/1990 |

(Continued)

OTHER PUBLICATIONS

European Patent Office "International Search Report and Written Opinion" dated Mar. 2, 2006 for International Appln. No. PCT/GB2005/003948.

(Continued)

*Primary Examiner* — Huy T Nguyen
(74) *Attorney, Agent, or Firm* — Ingrassia Fisher & Lorenz, P.C.

(57) ABSTRACT

An apparatus for applying an anti-copy protection signal for use with switchable head recorders, such as Video Hi-Fi recorders, is described. A high frequency pulsed signal is added to an original signal. The pulses interfere with the compensator circuitry such that the switching of the record head cannot adequately be masked on recording of a signal. On playback, the switching of the recording heads can subsequently be heard. In Video Hi-Fi recorders, the effect of the high frequency signals also interferes with the compressor-expander circuits to worsen the sound of the head switching.

18 Claims, 10 Drawing Sheets

(56) References Cited

U.S. PATENT DOCUMENTS

| | | |
|---|---|---|
| 5,161,210 A | 11/1992 | Druyvesteyn et al. |
| 5,194,965 A | 3/1993 | Quan et al. |
| 5,251,041 A | 10/1993 | Young et al. |
| 5,315,448 A | 5/1994 | Ryan |
| 5,394,274 A | 2/1995 | Kahn et al. |
| 5,513,260 A | 4/1996 | Ryan |
| 5,523,853 A | 6/1996 | Yamashita et al. |
| 5,583,936 A | 12/1996 | Wonfor et al. |
| 5,585,929 A | 12/1996 | Young et al. |
| 5,608,799 A | 3/1997 | Ryan et al. |
| 5,719,937 A | 2/1998 | Warren et al. |
| 5,737,417 A | 4/1998 | Buynak et al. |
| 5,784,523 A | 7/1998 | Quan et al. |
| 5,822,360 A | 10/1998 | Lee et al. |
| 5,907,656 A | 5/1999 | Oguro et al. |
| 6,018,608 A | 1/2000 | Sakashita et al. |
| 6,035,094 A | 3/2000 | Kori |
| 6,041,158 A | 3/2000 | Sato |
| 6,064,442 A | 5/2000 | Aihara |
| 6,091,822 A | 7/2000 | Mellows et al. |
| 6,188,832 B1 | 2/2001 | Ryan |
| 6,222,978 B1 | 4/2001 | Hirai |
| 6,268,889 B1 | 7/2001 | Koori |
| 6,271,889 B1 | 8/2001 | Bohm et al. |
| 6,327,422 B1 | 12/2001 | Quan et al. |
| 6,404,974 B1 | 6/2002 | Franklin |
| 6,459,795 B1 | 10/2002 | Quan |
| 6,516,132 B1 | 2/2003 | Wrobleski et al. |
| 6,600,873 B1 | 7/2003 | Brill et al. |
| 6,882,490 B1 | 4/2005 | Tan et al. |
| 6,904,153 B1 | 6/2005 | Wijnen et al. |
| 6,956,621 B2 | 10/2005 | Movshovish et al. |
| 7,236,683 B2 | 6/2007 | Quan |
| 7,471,479 B2 | 12/2008 | Tan et al. |
| 7,545,937 B2 | 6/2009 | Rumreich et al. |
| 7,805,056 B2 | 9/2010 | Quan |
| 8,160,423 B2 | 4/2012 | Robinson et al. |
| 2002/0009000 A1 | 1/2002 | Goldberg et al. |
| 2004/0039913 A1 | 2/2004 | Kruse |
| 2004/0252615 A1 | 12/2004 | Keech |
| 2005/0111661 A1 | 5/2005 | Wijnen |
| 2005/0162771 A1 | 7/2005 | Tan |
| 2006/0093326 A1 | 5/2006 | Tan |
| 2007/0030968 A1 | 2/2007 | Tan et al. |
| 2009/0202215 A1 | 8/2009 | Tan |
| 2009/0297125 A1 | 12/2009 | Wijnen et al. |

FOREIGN PATENT DOCUMENTS

| | | |
|---|---|---|
| EP | 0392612 A | 10/1990 |
| EP | 0763936 | 3/1997 |
| EP | 0831648 | 3/1998 |
| EP | 1169707 | 12/2003 |
| FR | 2740897 | 5/1997 |
| GB | 1571386 | 7/1980 |
| GB | 2164481 A | 3/1986 |
| GB | 2199689 A | 7/1988 |
| GB | 2348736 A | 10/2000 |
| WO | WO 96/00963 | 1/1986 |
| WO | WO 96/31878 | 10/1996 |
| WO | WO 88/02588 | 4/1998 |
| WO | WO 99/00977 | 1/1999 |
| WO | 9957723 A | 11/1999 |
| WO | WO 01/74068 | 10/2001 |
| WO | WO 01/76240 | 10/2001 |
| WO | 0188915 A1 | 11/2001 |
| WO | WO 02/15557 | 2/2002 |
| WO | WO 03/065716 | 2/2003 |
| WO | 2004066295 A1 | 8/2004 |

OTHER PUBLICATIONS

Great Britain Search Report dated Nov. 30, 2004 for Great Britain Patent Appln. No. 0422743.5.
Foede, W. "Video Copy Processor" Elektor Electronics, Elektor Publishers Ltd., Canterbury GB, Nov. 1, 1997, vol. 23, No. 20, pp. 28-33.
European Patent Office "European Search Report" dated Jun. 2, 2008 for European Patent Appln. No. 08002037.
Canadian Intellectual Property Office "Office Action" dated Aug. 22, 2012 for Canadian Patent Appln. No. 2,584,219.

though the young, or to those with a special interest in the content of the data, such as televisual or music enthusiasts. As a result, sales of copy protected work can sometimes suffer from the addition of a copy protection scheme alone.

AUDIO COPY PROTECTION SYSTEM

This invention relates to an audio copy protection system, and in particular to an audio copy protection system for use in a VHS Hi-Fi stereo recording system.

Present day recording technology allows audio and audio-visual signals to be easily recorded onto storage media such as magnetic cassettes, hard disk drives, compact discs, solid state memory devices, DVDs and so on. While this beneficially allows valuable audio and audio-visual data to be backed-up, it can also allow illegal copies of a work to be easily made. An illegal copy may comprise an unauthorised, freely obtained individual copy of an author's work for individual use, or at the other extreme may be one of a large number pirate copies reproduced and distributed to a greater number of people. In either of the two cases, an illegal copy represents lost revenue from the sales of the copyrighted work. For audio-visual content, such as films or movies, pirate copies of the work may have further consequences, such as decreasing the revenue from the box office opening of a movie.

Video cassette recorders can easily be used to reproduce copyright protected audio-video content. This may involve the connection of two video recorders to each other to record content from one tape to another. Alternatively, it may involve the recording of a broadcast signal, such as a terrestrial television signal or more particularly a pay per view TV channel signal, onto tape. It is desirable to prevent copying of this type so that a satisfactory version of the audio-visual content cannot be recorded by the VHS cassette recorder. A number of copy protection schemes have therefore been developed.

Many existing protection schemes however exhibit one major problem, that is the signal which has been modified so that it is protected is audibly or visually different from the original signal. Such differences can be especially noticeable to the young, or to those with a special interest in the content of the data, such as televisual or music enthusiasts. As a result, sales of copy protected work can sometimes suffer from the addition of a copy protection scheme alone.

In the case of recording signals using VHS recorders, another problem with copy protected signals is that the modified signal may interact unexpectedly with certain replay devices. A modified audio signal which is copy protected, may for example interact unexpectedly within a TV set causing it to be reproduced with annoying artefacts even during times of authorised playback. Such interaction may arise from the various RF video and audio signal chains present inside television receivers, which are not always able to perfectly screen signals from each other. Furthermore, cost effective processing of these signals often adds a certain amount of noise, interference and/or distortion.

The present applicant's European patent EP 1,169,707 discloses a system which prevents protected audio signals being satisfactorily recorded by audio magnetic cassette recorders. The system operates by adding to the audio signal a protection signal which interferes with the high frequency bias signal of the cassette recorder during recording to produce an audible spoiler signal which is recorded onto tape. A psychosensorial model is used to ensure that the added protection signal is not audible on authorised playback, but that the spoiler signal will detract from enjoyable playback of an illegal copy. Furthermore, a recording model is used to ensure that the added protection signal interferes sufficiently with the device on which playback is intended.

This protection scheme, and indeed any protection scheme which relies on interference with the high frequency bias signal in an analogue cassette recorder, is suitable for application to VHS mono recording. However, VHS Hi-Fi stereo recording systems use frequency modulation to encode the signals for recording onto tape with considerable pre- and post-processing, and the protection schemes described above are not therefore necessarily effective. We have therefore appreciated that there is a need for a copy protection system adapted for use with VHS Hi-Fi stereo VCRs to deter illegal copying.

SUMMARY OF INVENTION

The invention is defined by the independent claims to which reference should now be made. Advantageous features are set forth in the appendant claims.

In a preferred embodiment of the invention, there is provided an apparatus for applying an anti-copy protection signal for use with switchable head recorders, such as Video Hi-FI recorders. A high frequency pulsed signal is added to an original signal. The pulses interfere with the compensator circuitry such that the switching of the record head cannot adequately be masked on recording of a signal. On playback, the switching of the recording heads can subsequently be heard. In Video Hi-Fi recorders, the effect of the high frequency signals also interferes with the compressor-expander circuits to worsen the sound of the head switching.

BRIEF DESCRIPTION OF THE DRAWINGS

The invention will now be described in more detail, by way of example, and with reference to the following drawings in which.

PREFERRED EMBODIMENT OF THE INVENTION

The preferred embodiment of the invention provides a copy protection scheme targeting the audio part of audio-visual signals, for use in a VHS Hi-Fi video recorder. In order to appreciate the operation of the preferred embodiment, explanation of the operation of a typical VHS Hi-Fi VCR shall first be made.

Figure 1:
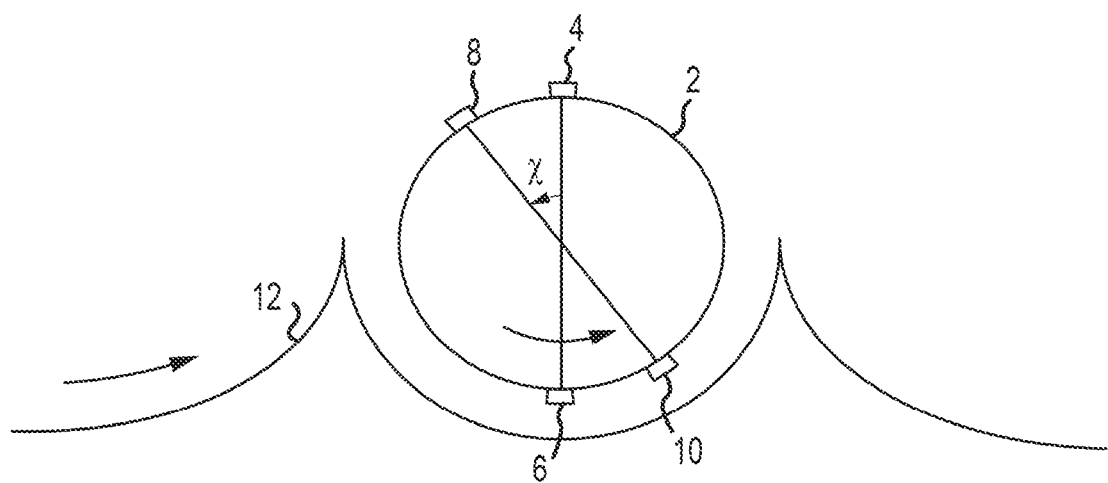
FIG. 1 shows a schematic illustration of the recording heads in a typical VHS Hi-Fi stereo VCR.

FIG. 1, illustrates the arrangement of the video and audio recording heads in a VHS Hi-Fi video recorder, as well as the path that the video tape takes itself. The video recorder comprises a rotating head drum 2 having a pair of video heads 4 and 6 and a pair of audio heads 8 and 10 mounted on its periphery. Video tape 12 is constrained to travel past the rotating head drum by means of a spooling system (not shown). The tape is spooled around the head of the drum, such that an audio and a video head is in contact with the tape at any time. As one audio head leaves the tape, the other audio head is just coming into contact with it, the same being true for the video heads. This means that the signal being read from or written to the tape is discontinuous, breaking where the head is switched over. A circuit in the video recorder is used to switch between the audio and video heads at the correct time and to suppress any discontinuity in the signal at this point.

For the video signal, the head-switching is arranged to occur during the last few lines of a video picture frame, which are off screen in typical over scanned domestic televisions. This means that the video head-switching is usually unseen by the viewer. However, for the audio signal, there no convenient moment or break-point where the head-switching can be hidden, since the audio signal is necessarily continuous. As a result, the audio head-switching must be efficiently suppressed. If it is not, an annoying buzz in the audio signal, corresponding to the switching rate of about 50 or 60 Hz, will be heard.

Figure 2:
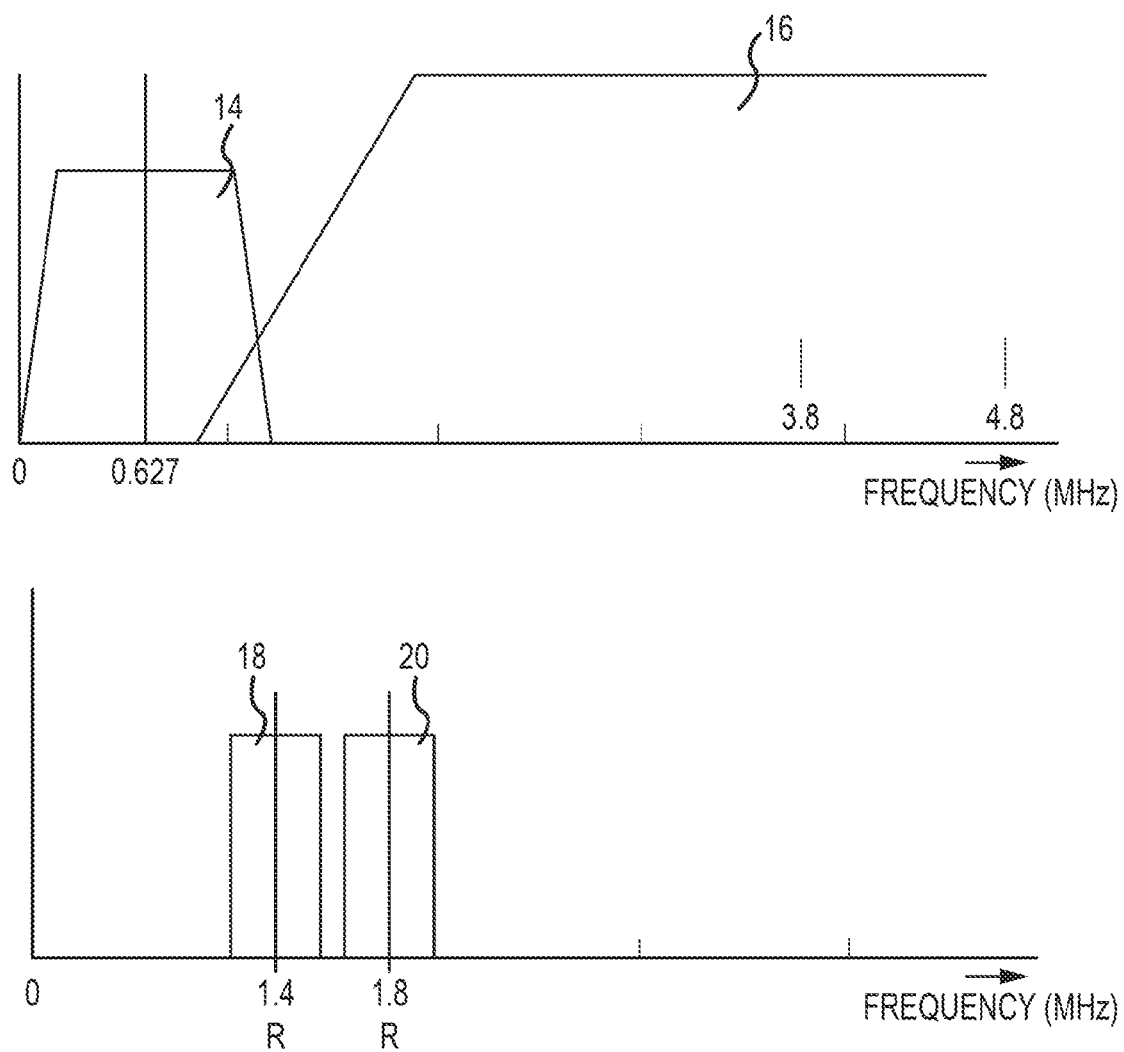
FIG. 2 shows the frequency spectrum of the audio and video signals in the VHS Hi-Fi recording scheme.

The audio and video heads record information onto the same physical area of the tape, and the spectrum of the Hi-Fi audio signals on the tape overlaps with that of the video information. This is illustrated schematically in FIG. 2. The upper graph in FIG. 2 illustrates the spectrum for the video information recorded onto the tape. The video information comprises chrominance signal 14 and luminance signal 16. In the lower graph in FIG. 2, the audio signal spectrum is shown. The audio signal can be seen to comprise separate left 18 and right 20 audio channel information. The left channel typically has a frequency of 1.4 MHz and the right channel a frequency of 1.8 MHz. Thus, to separate the audio and video signals on playback the difference in the angle of the heads, which gives a difference in timing, is used. In FIG. 1, the audio recording heads are shown to lead the video recording heads by an angle of x degrees. This is typically around 40° or 60° for the PAL format depending on the VCR. This means that when recording, the audio signal is written to the tape first. It is then partially erased, that is attenuated by 12 dB, as the video signal is written over it. This results in the signal to noise ratio of the audio signal on the tape being around 50 dB. The effective head-switching also adds noise to the signal. An elaborate signal processing chain is then used to deliver Hi-Fi quality sound from the recorded audio signal. A typical processing chain is shown in more detail in FIG. 3.

Figure 3:
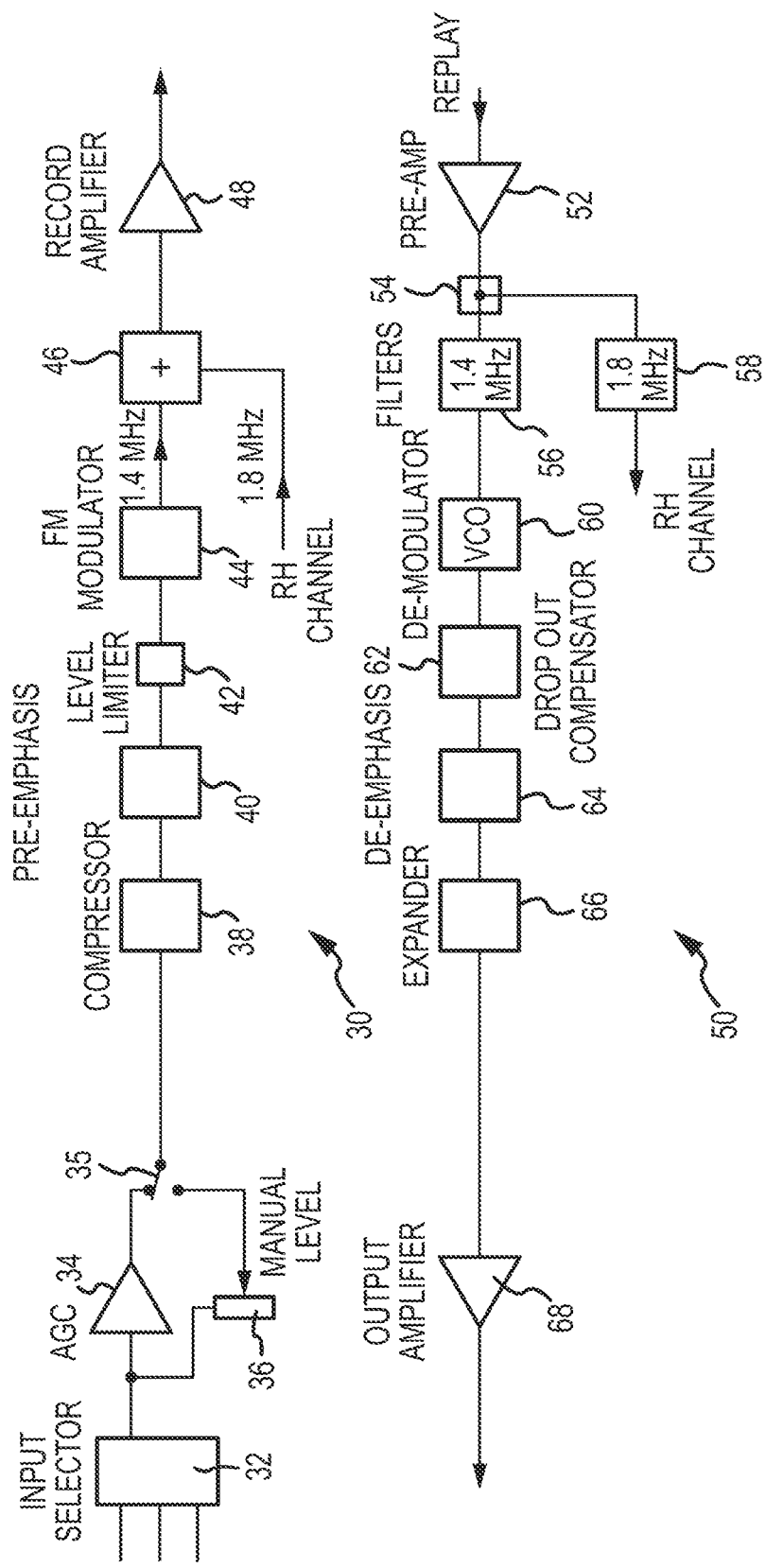
FIG. 3 is a block diagram of audio signal processing within a VHS Hi-Fi stereo VCR.

The upper part of FIG. 3 shows the input processing chain 30 for a single audio channel in a VHS Hi-Fi video recorder. The signal is first received at input selector 32 and is then passed to automatic gain control circuit (AGC) 34, which amplifies the signal to a pre-determined level. Alternatively, the AGC can be bypassed by switch 35 connected to manual level resistor 36. Following the switch 35, the signal is subject to a number of processing steps by different circuits. The signal is first passed to compressor circuit 38, pre-emphasis circuit 40, level limiter 42, and FM modulator 44. Following the FM modulator 44 is an adder circuit 46 for combining the output of a corresponding FM modulator in the other channel of the audio input processing chain with the signal in the present channel. In FIG. 3 it will be appreciated that the left channel is shown, and the right channel is added into the input chain at adder circuit 46.

The output from adder circuit 46 is then amplified by amplifier 48 and is passed to recording circuits, not shown.

The bottom half of FIG. 3 shows the corresponding circuitry 50 for playback from the video recorder of a recorded signal. The signal is received at pre-amp 52, following which it is divided by divider circuit 54 and passed to left and right channel filters 56 and 58 respectively. Following filter 56, is a voltage controlled oscillator 60 which is used to demodulate the received FM signal. Following the demodulator, the signal is passed to drop out compensator 62, de-emphasis circuit 64, expander circuit 66, and finally to output amplifier 68. It will be appreciated that the processing chain for the right hand channel is identical to that of the left channel.

Audio tracks recorded in the VHS Hi-Fi format exhibit a relatively high level of noise because of the combination of head switching effects and the overwriting of video data mentioned earlier. To improve the perceived quality of the recorded audio signal a number of steps are taken.

Firstly, drop-out compensator 62, re-generates any missing information caused by tape faults or head-switching.

The drop-out compensator 62 typically operates by analysing the frequency modulated audio signal on either side of the discontinuity and extrapolating to fill the gap. In simple systems, the frequency modulated audio signal directly before the break is merely copied and inserted into the gap until the audio signal is received again on the other side.

Secondly, the compressor circuits 38 amplify the audio signal prior to recording to boost it at least partially above the noise, and thereby increase the signal to noise ratio. After recording, the effects of the compressor circuit, which alter the sound of the audio signal somewhat, are reversed by the expander circuit 66.

Figure 4:
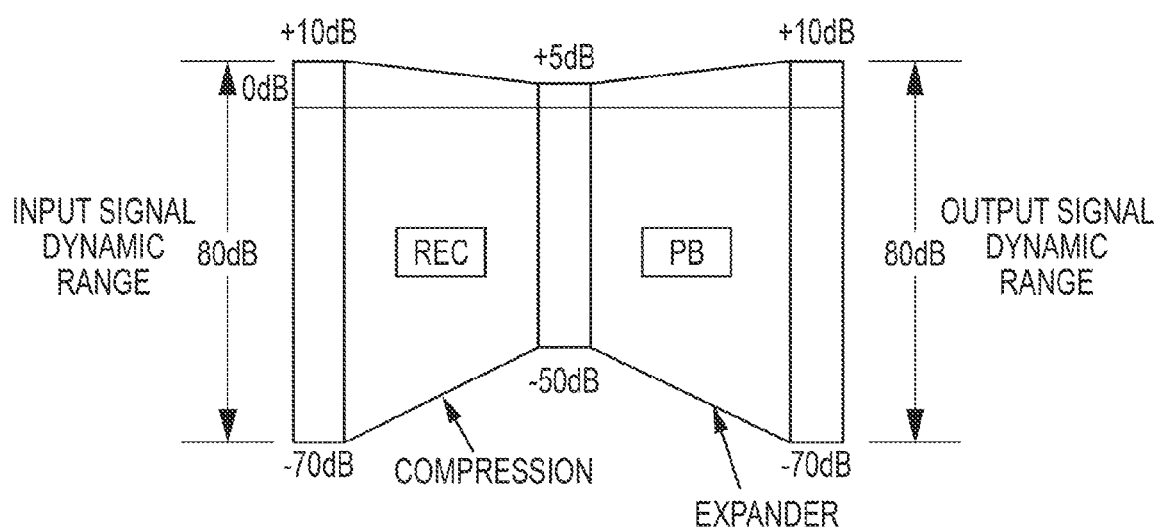
FIG. 4 schematically illustrates the compression and expansion effect of the compander circuits.

The compressor and expander circuits are collectively known as the 'compander circuit'. The general compression and expansion characteristics of the compander circuit are shown schematically in FIG. 4. The left hand side of the diagram corresponds to recording (REC) and the right hand side corresponds to playback (PB). On recording, the amplitude of an input signal is compared with a reference level (0 dB), and either amplified or suppressed. For example, a 'loud' signal component of 10 dB above the reference level is suppressed to a level of +5 dB, whereas a 'quiet' signal component of 70 dB below the reference level is boosted to a level of −50 dB. As a result a signal with a dynamic range of 80 dB is compressed to have a range of 55 dB. In the expansion process, this effect is reversed. It will be appreciated that 'loud' and 'quiet' in this instance refer to the decibel level of a signal component in comparison to a reference level, not to the perception of the loudness of the signal by a listener, which can depend on a number of factors.

During this compression process, the high frequency signal components are compressed to a greater degree than the low frequency signal components. This is to improve the signal to noise ratio, and to prevent high amplitude high frequency signal components from overdriving the FM modulator. Conversely, on expansion the high frequency signal components are magnified to a greater degree than the low frequency signals.

Although the compression is frequency dependent, that is more compression is applied to high frequency signals than low frequency signals, the compressor is a single band device, meaning that a fixed response curve is applied across the entire audio band. This is in contrast to a multiband device which may adjust signal components in individual frequency ranges independently of each other.

Figure 5:
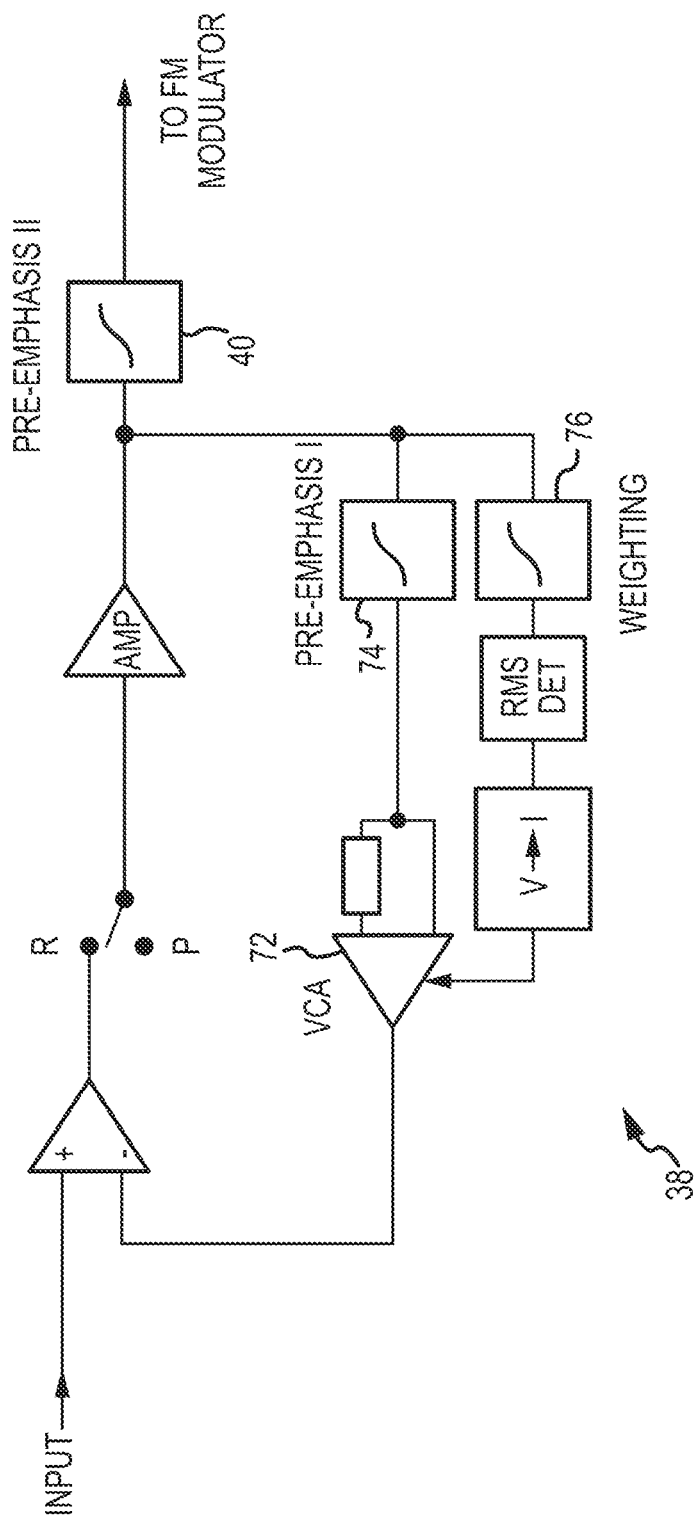
FIG. 5 is a block diagram illustrating the compression circuit shown in FIG. 3.
Figure 6:
FIG. 6 is a schematic illustration of the frequency response in the compander circuits.

This will be appreciated from FIGS. 5 and 6 to which reference should now be made. The compression circuit 38 comprises a feedback voltage controlled amplifier arrangement 72 having two input branches. Each branch has a frequency responsive function applying pre-emphasis processing 74 or weighting 76 respectively. Both of these functions favour high frequencies as described above. A pre-emphasis curve is illustrated schematically in FIG. 6, showing a higher frequency response at higher frequencies.

We have appreciated that the operation of these circuits in the VHS Hi-Fi system can be utilised to provide an advantageous anti-copy protection effect as follows. A high-frequency anti-copy protection signal which is ordinarily undetectable to the viewer or listener is added to the audio or audio-visual content to be protected. The presence of the signal is such that during recording the operation of the compander and drop-out circuits is affected, resulting in a poor quality recording which is unlikely to give a satisfactory playback.

A preferred embodiment of the invention will now be described in more detail.

Figure 7:
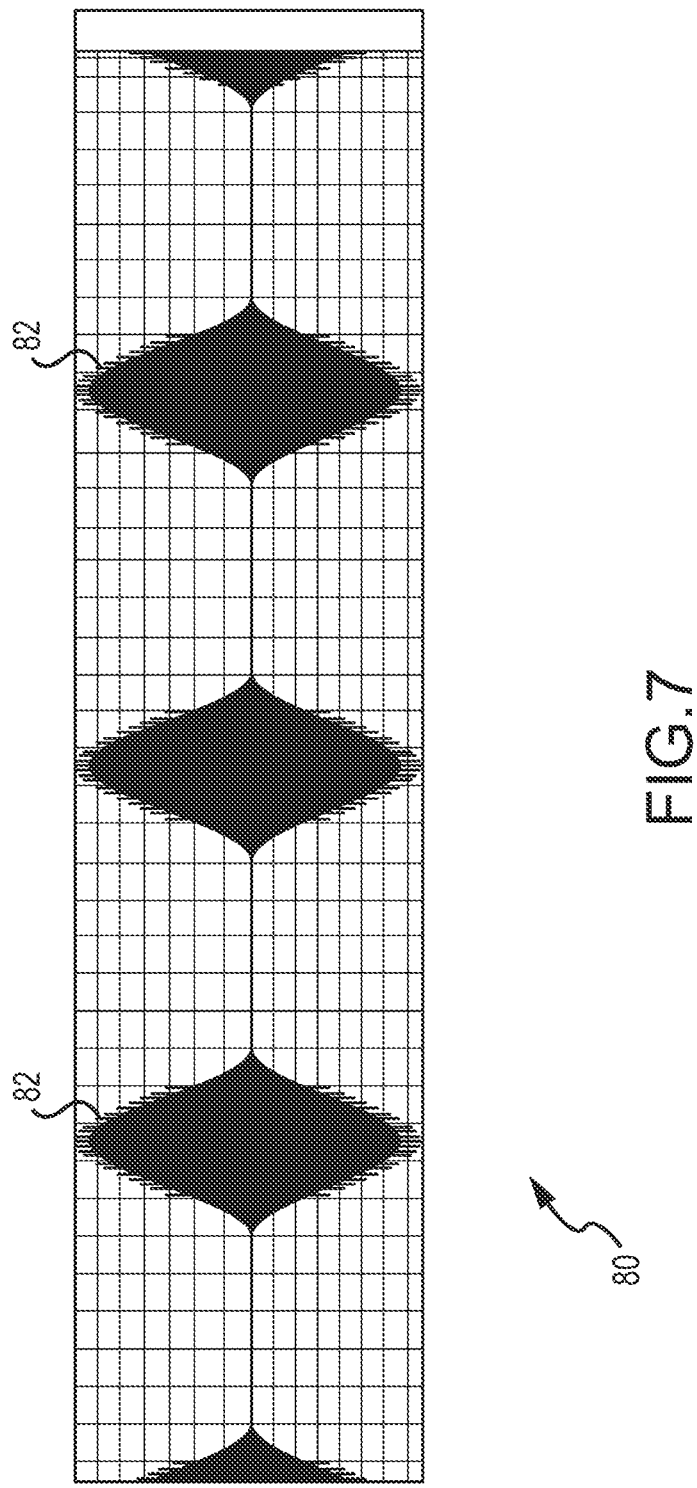
FIG. 7 illustrates a preferred anti-copy protection signal according to the invention.

The anti-copy protection signal 80 in accordance with the preferred embodiment of the invention is shown in FIG. 7 to which reference should now be made. The protection signal comprises pulses 82 of a high frequency signal, which are generated with a repetition rate of approximately the video synchronisation rate of the rotating head drum 2. It will be appreciated that the video synchronisation rate is the rate at which the video or audio recording and playback heads come into contact with the tape, and is therefore twice the rotational frequency of the recording head drum. The frequency of the pulse signal is sufficiently high, so that it is not ordinarily audible to the human ear, and so that the pulses interfere with the satisfactory operation of the compander circuits. A pulsed tone of frequency 19.5 kHz has been found to work well in practice. A tone of 22 kHz or anything in the range 20 kHz to 24 kHz is also possible.

Figure 8:
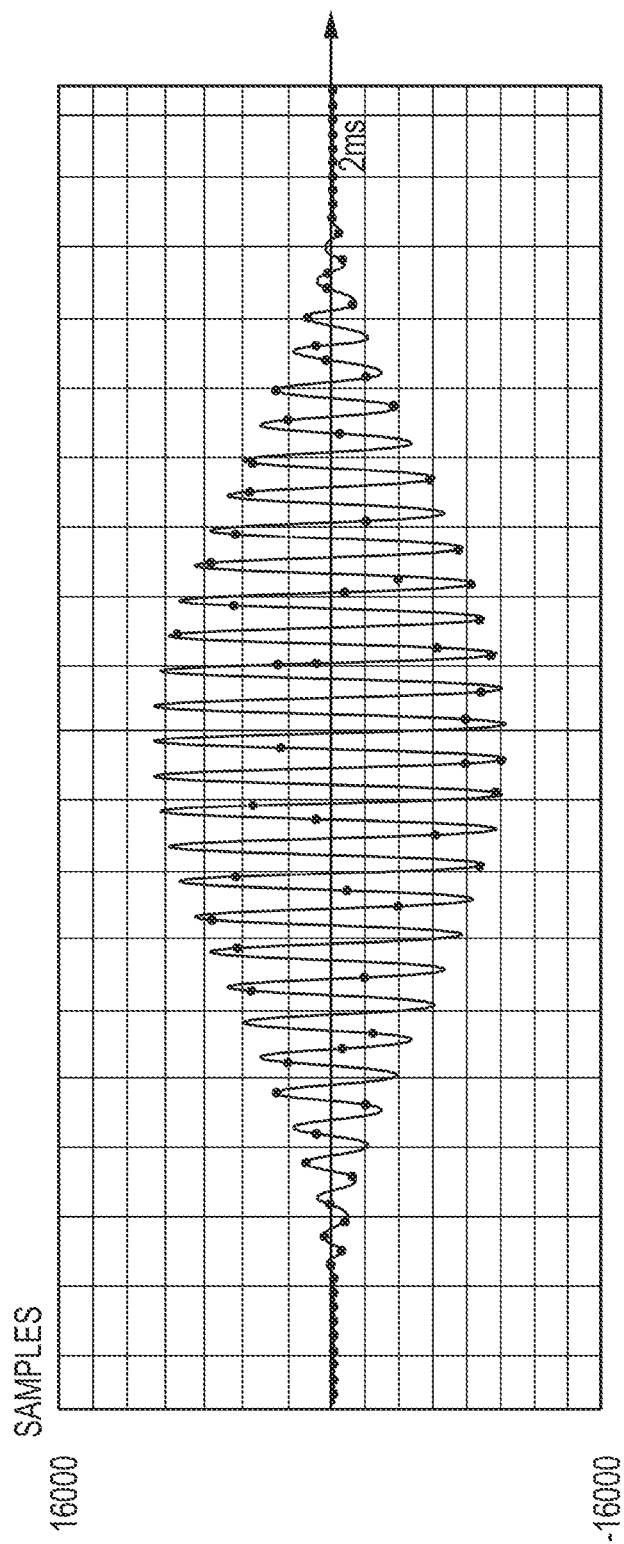
FIG. 8 shows part of the anti-copy protection signal illustrated in FIG. 7 in more detail.

To produce the pulsed signal, a pure tone of frequency 19.5 KHz is preferably modified using a suitable window or gating function. A single 'pulse' is shown in FIG. 8 having a duration of about 2 ms, and a full scale amplitude of about −14 dB in the digital domain (about 1.13 Vpp in the analogue domain). The figure represents the amplitude on a vertical axis of 16-bit samples.

Figure 9:
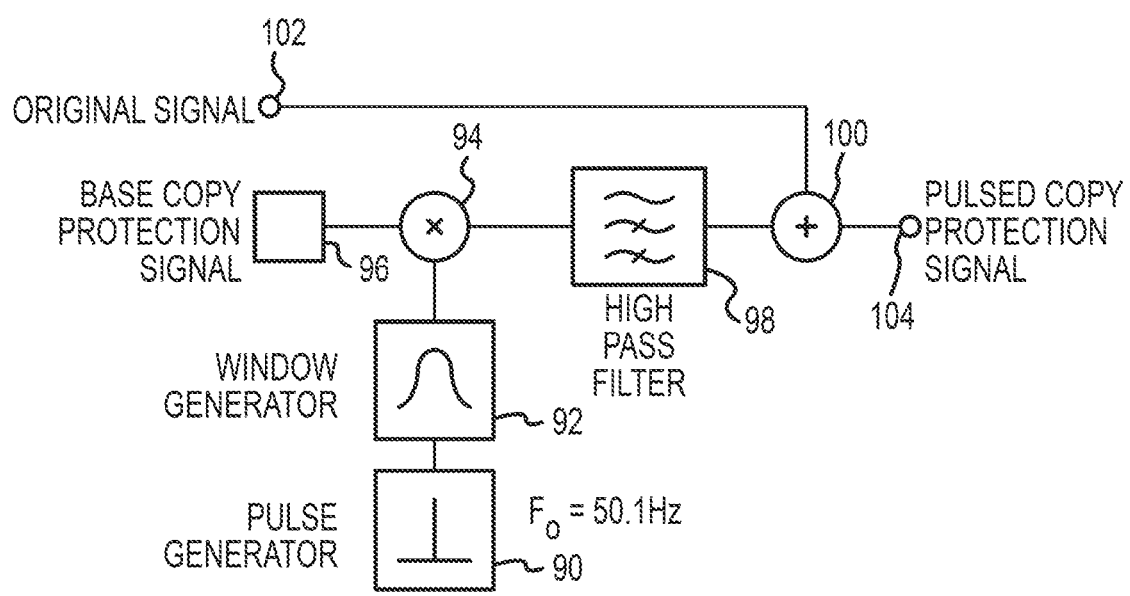
FIG. 9 is an illustration of a preferred apparatus for producing the anti-copy protection signal shown in FIG. 6.

A preferred apparatus for producing this signal is illustrated in FIG. 9.

Assuming that the video synchronisation rate or the video field rate is 50 Hz in the video transmission system, pulse generator 90 preferably produces high frequency pulses at a repetition rate of 50.1 Hz. The repetition rate is chosen on the basis of the video field synchronisation rate in the video broadcasting format with which the protection scheme is desired to work, and is therefore typically set to 50.1 Hz or 60.1 Hz. It will be appreciated that if the base audio copy protection signal were abruptly pulsed on and off at each desired moment, then the switching transient would cause audible problems across the audio band. For this reason, the pulses output from pulse generator 90 are passed through window generator 92, which reduces the effect of spectral spreading of the pulses. Various window functions can be used to reduce the spectral spread in this manner, but a Hanning raised cosine window is preferred for convenience. The filtered pulses output from window generator 92 are then passed to multiplier circuit 94 where they are combined with a base copy protection signal produced by base signal generator 96. The base protection signal is preferably a pure tone of 19.5 kHZ as described above, but could also take any other form as desired. Such forms of protection signal will be described later. The copy protection signal output from multiplier circuit 94 is then passed through a high pass filter 98 to remove any remaining components of spectral spreading of the pulses from the audible region of the spectrum. The filter may be of the "brick wall" type, a more gentle filter, or even a psychoacoustic-designed filter based on known "minimum audible field" data.

Only one of the windowing function, or the high pass filter may strictly be necessary to provide sufficient suppression of transient signals. However both are preferred as despite windowing, pulse copy protection signal components may nevertheless be present in the audio band.

The filtered protection signal is then passed to adder circuit 100 where it is combined with the audio signal which is to be protected, and which is received at input 102. The output from adder circuit 100 is a protected audio signal which is then passed to output 104.

The input 102 and output 104 can be incorporated into the signal processing chain at any point, from the point at which the audio-visual content is originally captured, up to the point at which the content is sent out of the analogue output of the consumers replay device. This allows, the audio copy protection to be added during content mastering, during broadcast, or within the replay device itself. The ability to add protection at the mastering or broadcast stage is especially useful as the protection is then present at all subsequent analogue outputs.

Figure 10:
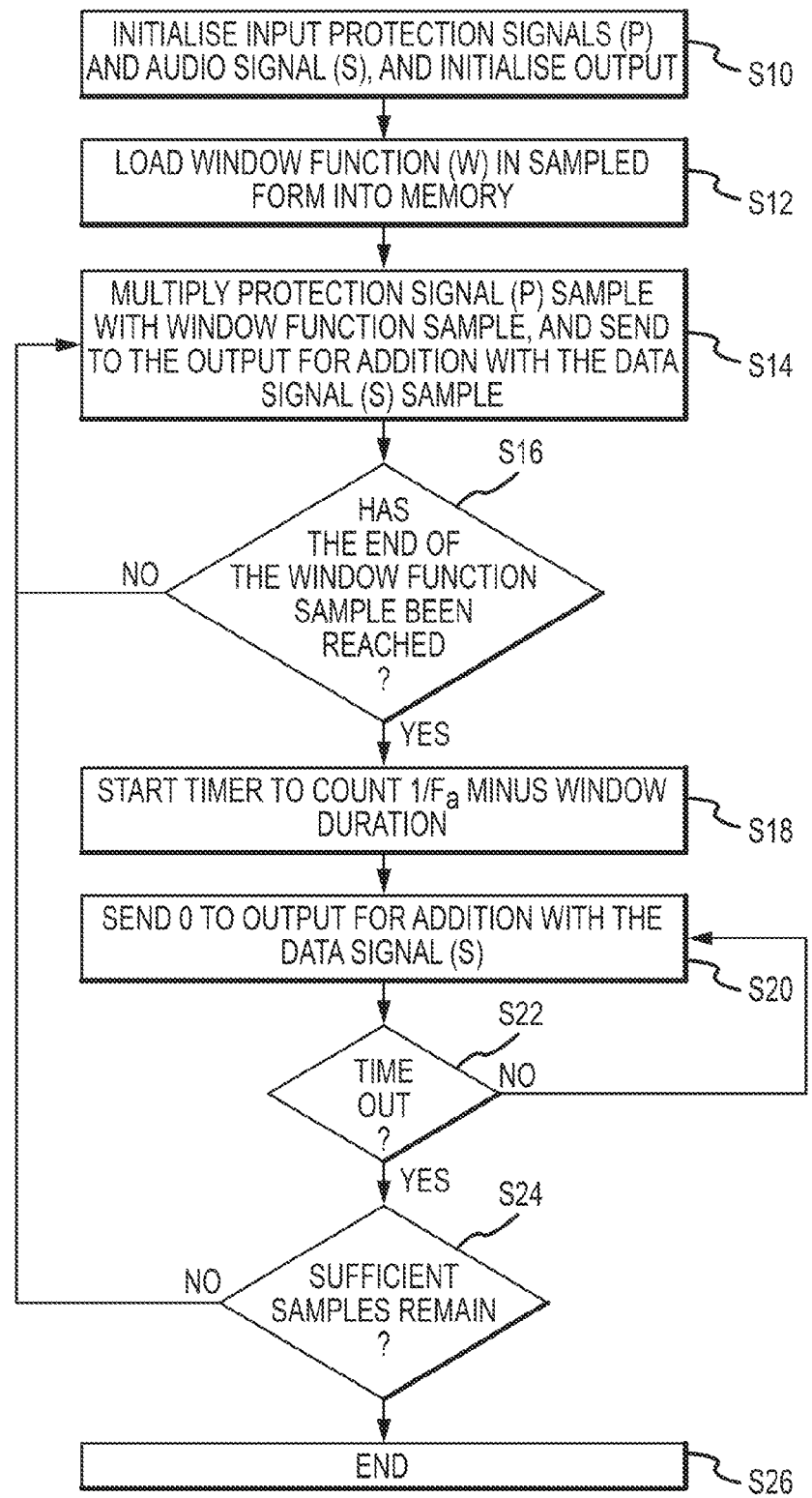
FIG. 10 is a flow chart illustrating the implementation of the preferred embodiment of the invention in a software process.

The preferred embodiment of the invention described with reference to FIG. 9 is implemented in hardware. However, it will be evident to those skilled in the art that it may also be realised in software, or as a combination of hardware and software. Furthermore, the preferred embodiment may be arranged to operate in the digital domain, or in the analogue domain. Digital processing is however preferable. FIG. 10, to which reference should now be made, illustrates an alternative implementation of the preferred embodiment in software.

The process starts in step 10 in which the input and output signals of the digital processing software are initialised. A high frequency protection signal (P) and the data signal to be protected (S) are loaded into memory and stored. The input signals may be loaded into memory in their entirety before processing occurs, or alternatively, the input signals may be continue to be loaded while processing is taking place.

Subsequently, in step S12, a window function is loaded into memory for windowing the protection signal (P) received at the input to produce a pulsed protection signal of repetition rate $F_a$. This windowing function may be thought of as equivalent to the pulse generator mentioned in the hardware implementation described in FIG. 9.

Control then flows to step S14 where a sample taken from the input protection signal (P) is multiplied with a coincident sample taken from the window function (W) stored in memory. The product of the two inputs is then sent to the output for addition to the coincident sample from the input data signal (S). In step S16, a check is made to see whether or not the window function has been fully sampled. If it has not, then control flows back to step S14 where a subsequent sample from the pulse signal (P) is multiplied with a subsequent sample from the window function and the product sent to the output for addition to the data signal (S).

Once the last sample of the window function is combined with a signal sample from the protection signal (P) and sent to the output, control flows to step S18. In this step, a timer is started which is arranged to count for a duration of time equal to the period at which the pulses are to occur, that is $1/F_a$, (where $F_a$ is the chosen repetition frequency of the pulses) minus the duration of the window function duration. In other words, the timer counts the time remaining from the end of the window function to the beginning of a subsequent pulse period.

While the timer initiated in step S18 is running, a zero value is sent to the output in step S20 for addition to the data signal (S). In step S22, a check is made to determine whether or not the timer has lapsed. If it has, then control flows to step S24 where a check is made to determine whether unmodified data signal samples remain, and if they do whether enough samples remain to add a further whole pulse to the data signal. It will be appreciated that it is undesirable to finish the modification process leaving a pulse incomplete. If sufficient samples remain, then control flows back to step S14 for subsequent combination of audio samples with the protection signal samples modified by the window function. Otherwise, the protection process exits at end step S26.

The preferred embodiment of the invention, therefore adds a pulsed signal, like that shown in FIG. 7 to the audio signal. The effect of the pulsed signal on the drop-out circuit and compander circuits will now be described in more detail.

At the point of the audio head switching, the signal to noise ratio of the audio signal is at its worst. As described earlier, under normal operation, the drop-out compensator car extrapolate the varying frequency modulated audio signal to fill the gap caused by the head switching. However, the high frequencies associated with the pulses of the protection signal, mean that the frequency variation, and rate of frequency variation in the frequency modulated audio signal are significantly outside the normal range wherever a pulse occurs. If this rapid variation in the audio signal is timed to occur before a gap, then the drop-out compensator is no longer able to cope and is unable to operate properly. As a result, the sound of the head switching is not adequately removed from the signal. On playback of a recorded audio signal therefore, the sound of the head switching will be audible and will impair enjoyment of listening to the signal.

The noise generated by the head switching is made more severe by the effect of the pulses on the compander circuit. It will be understood from the earlier discussion, that if there is a 'loud' high frequency signal and a 'quieter' low frequency signal, considerable compression during recording, and subsequent expansion during replay will be applied to the signal. This is because the compander circuits respond more to high frequencies than the low. The protection pulse therefore dominates the response of the compander circuit. This means that the loud high frequency signal, provided by the protection pulse, will cause the rest of the useful signal, which is at lower frequencies, to be recorded on the tape at a lower level than is optimum if the pulse was not present. Thus, when the low frequency signal is expanded on playback, the tape noise in this part of the spectrum is correspondingly increased, and any remnant of head-switching effects or tape drop out, which has not been suppressed by the drop out compensator circuit 62 is also amplified. It will be appreciated however that the effect is only apparent once the protected signal has been recorded.

Although a constant high amplitude, high frequency signal would be effective as audio copy protection, a pulsed protection signal is preferred for a number of reasons. Firstly, an audio signal which is pulsed, and hence effectively "off" for the majority of the time, contains much less average energy than an audio signal of equal peak amplitude which is constantly "on". The perceived loudness of a signal is correlated to the average energy of that signal. Lowering the average energy therefore reduces the perceived loudness, and can therefore make the protection signal difficult to detect with the ear. This is beneficial, as a continuous protection signal may be detected by sensitive listeners. There is less likelihood of this happening with a pulsed signal.

Also, the heating effect and power consumption in audio equipment used to process, amplify, and to transduce the signal is, in many cases, correlated with the energy of the signal. Reducing the energy of the signal therefore, also reduces these unwanted factors. Secondly, a continuous signal may cause serious and unpredictable effects on interaction with the signal chain in many television systems. By using a pulsed signal, the effect of these interactions is reduced to a point where for practical purposes it is not noticeable.

Lastly, the presence of the pulses mean that the level limiter 42, which performs a gain adjustment function, has to make rapid adjustments either side of the pulses. In practice, it is not able to do this satisfactorily and the pulses remain at a level that is too high to record properly. This gives rise to distortion in the recorded pulse forms which makes them audible on replay. A pulsed signal is therefore preferred so that this third effect can be utilised in the protection.

In an ideal device, the timing of the pulses is preferably synchronised to occur in exact correspondence with the switching of the audio heads during recording of the material. This means that the presence of the pulse always affects the operation of the drop-out compensator 62. In MPEG-2 systems, for example, the anti-copy protection signal may be inserted directly into the audio file containing the original signal. The synchronisation with the video head switching would then be relatively straightforward to implement by monitoring and controlling the MPEG-2 program stream.

However, apart from operation in set-top boxes, where the video frame timing can be read from the video processing circuits, perfect synchronisation is difficult to achieve. In video recorders, where the timing of the start or end of the video frame cannot be readily deduced, protection pulses with a repetition identical to the video head switching rate are more likely to correspond in timing to when the head is not being switched than when it is.

Furthermore, the azimuthal angular displacement and corresponding phase difference in switching of the audio head from the video head on the recording head of the device, vary from device to device, and it is therefore impossible to predict in advance what figure would give exact synchronisation.

As described above therefore, the pulses are preferably arranged to be almost in synchronisation with the video field rate. This will cause the copy protection effect to appear and disappear regularly on Hi-Fi stereo VCRs. The exact angular spacing of the video and audio heads, and hence the delay between the video horizontal synchronisation and the audio head switching does not matter, since this method will sweep through all possible delays.

For example, it the video field rate is 50 Hz and the protection pulse rate is 50.1 Hz, then the protection pulse will drift in and out of synchronisation with the audio head-switching once every ten seconds. This will ensure that there is a region in which the protection applies at least once every ten seconds. The duration of each pulse of the audio copy protection signal will also determine the duration of this effective region. Different relationships between the pulse repetition rate and the video field rate will cause the audible protection noise to appear and to disappear at different rates of repetition.

How much the pulse rate is arranged to differ from the vertical synchronisation rate is a question of how much noise can be tolerated in an illegal copy of the signal before it is not worth watching. As described above a difference of 0.1 Hz means that the effect of the protection signal will become apparent every 10 seconds. On the other hand, a difference of 0.01 Hz will mean that the effect of the protection signal will become apparent every 100 seconds. Although, this rate of effectiveness might be considered by some to be adequate protection, it is preferred to have the effect occurring more frequently so that the enjoyability of watching an illegal copy is ruined for the majority of the time.

Additionally, the pulses may be arranged to occur at integer or near integer multiples of the vertical synchronisation rate, that is for a vertical synchronization rate of 50 or 60 Hz, at a rate of about 100 Hz or 120 Hz, 150 Hz or 180 Hz, and so on. This would result in a train of pulses that would more likely be in synchronisation with the head switching, but would also result in the average energy of the signal being raised. The repetition rate could on the other hand be set at 25 Hz and 30 Hz, or lower divisible multiples, although this would make the protection less effective.

In determining the shape of the pulses for the copy protection signal, there is a trade off between the effectiveness of the signal and playability issues. It is desirable to have longer pulses for example as this causes the interference of the protection to persist for longer. However, a lower average signal energy, given by shorter pulse durations, leads to a desirable reduced negative effect on playback of authorised copies.

The preferred pulses, as shown in FIG. 7, correspond to a pure tone signal of 19.5 kHz. The amplitude of this signal may be in the range from approximately minus 30 dB to 0 dB relative to the digital full scale on typical consumer equipment (which gives say an analogue output of 2 Vrms from a digital audio signal with an amplitude equal to digital full scale). In voltage terms this represents a signal between 0.05 Vrms and 2 Vrms. Values outside this range may be appropriate in certain circumstances, such as different equipment specifications in different markets, and/or target application areas, or where subsequent processing will change the amplitude of the signal. The preferred maximum voltage for the copy protection signal before processing is around 0.05 Vrms. Typical pulse durations are of the order of two milliseconds, though any pulse duration, up to the point where adjacent pulses overlap, can be used. As described above, however, this may lead to some playability problems.

Where the base copy protection signal is more complex than a single tone, a graph of the pulses may appear significantly different to that shown in FIGS. 7 and 8 but the envelope, which depends on the chosen pulse-windowing function, is preferably still the same.

If a fixed tone signal is used, several factors are taken into account in choosing the appropriate frequency. Firstly, the frequency must be high enough to be inaudible to the vast majority of listeners. Secondly, up to a certain limit, the higher the frequency the greater the effectiveness due to the pre-emphasis filters. Thirdly, if the copy protection is being carried out during mastering or broadcast, not in the replay itself, then the frequency must be low enough to pass through the subsequent signal chain, including processing, encoding, broadcasting, decoding/demodulation, and possible re-modulation. The lower frequency limit is therefore set such that the anti-copy signal remains inaudible, while the upper limit is set such that the signal remains within the bandwidth of the encoding system.

In practice therefore, a range of frequencies of say between 17 kHZ and 22 kHZ may be suitable, being used simultaneously or sequentially. If the protection was not required to be compatible with the Dolby AC-3 encoding process for example, such as for use with a DVD Video Disc containing linear PCM audio, then a higher frequency of say 22 to 24 kHz would be preferable. Additionally, the high frequency signal can be generated by gating or switching a pure tone, or a noise band.

Alternatively, the frequency and amplitude of the copy protection signal may be dynamically chosen using psychoacoustic principles, based on the contents of the original audio signal, and/or the human auditory system. For example, during louder passages of the original signal, the anti-copy protection signal can be added at a higher amplitude, without it being audible, or causing audible interactions within the television receiver. On the other hand, in the Dolby AC-3 process for example, encoding and decoding typically raises the level of very quiet sections of the audio signal. Preferably, therefore, the amplitude of the copy protection signal is reduced during quiet sections so that the ability of the dynamic range control in the Dolby process to detect the quiet sections is not affected.

Alternatively, where some element of the subsequent encoding will be undesirably altered by the presence of copy protection, for example the aforementioned dynamic range compression within Dolby AC-3 encoding, it is possible to correct for unwanted changes in the output bitstream by post processing the encoded bitstream itself. It may be advantageous to encode original and copy protected versions of the signal, and then replace any undesirably altered elements in the copy protected encoding with the corresponding elements from the original encoding. In some circumstances, it may be possible to predict what these elements would have been without encoding the original signal, and replace these elements with known or predicted values.

Psychoacoustic selection of a protection signal is described in more detail in the present applicant's above mentioned European patent. Preferably the psychoacoustic processing and recorder modelling processing is then arranged to occur at the output of the protection process described above, instead of, or as well as at the input.

Application of the preferred anti-copy protection signal in certain psychoacoustic coders has been found to trigger 'short block detection'. In order to compensate for this, a low level 'patching' signal of substantially the same frequency as that used for the protection signal is preferably added in between the pulses. Such a signal has been found to prevent short block detection, and force the coder to employ long block detection instead. However, the patching signal should only be added to the anti-copy protection signal at locations where the psychoacoustic codec would have used long block encoding, otherwise the quality of the resulting signal can be degraded.

The process described above in accordance with the preferred embodiment may be applied to stereo signals simply by applying the process to each of the two stereo channels in parallel. This may be extended for any number of audio channels, though it may be beneficial to process some, rather than all, channels of a multi-channel audio signal depending on how these channels will typically be mixed-down for stereo reproduction.

In order to avoid interference between the anti-copy protection and the operation of certain active matrix surround decoder systems, the relative timing and phase of the pulsed signal can be altered to match that present in the original audio signal, using well known phase detection circuits. This ensures that similar phase detectors in the surround decoder are not confused by the copy protection system.

Furthermore, one or more of the phase, frequency, and/or amplitude of the anti-copy protection signal may be made different on one, some or all channels where this is required to ensure good playability of the protected signal on equipment sensitive to the proposed modifications. As a result, the difficulty with which the protection could be removed may be different for each channel. Such equipment may include not only surround sound decoders, but any other equipment that matrixes or modulates the signal. The protection signals in each channel may therefore be independent of each other, or related but different.

Where perfect synchronisation with the video signal is possible, such as if the copy protection signal is applied in a set top box, then the pulse generator is preferably run at exactly the video field rate, and is locked to it. Indeed, the pulse generator may be replaced by a video synchronisation separator, and a new pulse-train, generated from the detection of the vertical synchronisation pulses in the video signal, may be delayed and used to trigger the window function. The delay is chosen to match the delay between the video and audio head-switching in as many VCRs as possible. We have found that at least two different audio and video head-switching offsets are common in domestic VCRs, these being around 40° and 60° for PAL systems. Where perfect synchronisation is possible, it is therefore preferable to switch between these two or more delays periodically to ensure that the protection effect is experienced across as many video recorders as possible.

The various AGC-like functions operating in the base-band audio and FM frequency modulation domain of typical Hi-Fi stereo VCRs, means that an effective copy protection affect can be achieved even when the desired synchronisation rate is not known. This relies on varying the pulse repetition rate so that it sweeps up and down between approximately 20 and 150 Hz at a rate of between 0.1 and 10 times per second. This can be achieved using the circuit described in FIG. 9, but with the pulse repetition rate controlled by a slow sinusoidal input. Varying the rate, and switching between a constant rate and a varied rate maximises effectiveness across a wide range of recorders. The rate at which the pulses are generated can also be varied so that the copy protection scheme is applicable to recording schemes employing different field synchronisation rates, such as PAL, NTSC, and SECAM.

Additionally, it has been found particularly effective to vary the repetition rate of the pulses in proportion to, or in inverse proportion to, the loudness of the incoming audio signal or the difference between the current loudness and the local average loudness. In speech signals, for example, the protection effect is found to 'bounce around' with the speech in an annoying manner. The amplitude and frequency of the protection signal can also be varied in this way.

In an alternative embodiment of the invention, the horizontal synchronisation rate may be used as a basis for the rate of the protection signal, instead of or as well as the vertical synchronisation rate. In this arrangement, the protection signal need not be pulsed, and is preferably a pure sine wave. A pure sine wave equal to the line frequency or a multiple of the line frequency has been found to satisfactorily produce some of the effects and advantages of the field-synchronisation based system described above. This is because the audio inputs of many VCRs are still susceptible to harmonics of the line frequency even though this frequency is outside of the conventional audio frequency range.

An advantage with this alternative embodiment is that the generation of the audio copy protection signal is simpler, as no gating or windowing of pulses is needed. A disadvantage however is that unless the protection signal is of line frequency, it can be too high to be stored, reproduced or transmitted by many media or broadcast systems in use today. As a result the protection may not always be useable.

Assuming, the media and broadcast systems can store and transmit high frequency signals, an audio copy protection signal of a pure tone at exactly twice the line frequency is preferred. This means that for systems which operate with a field rate of 60 Hz, the protection signal should be 31,468.5 Hz. For systems, which operate with a field rate of 50 Hz, the protection signal should be 31,250 Hz.

The effectiveness on VHS Hi-Fi stereo recorders at these frequencies is good, since the pre-emphasis filter boosts this frequency range strongly. The effectiveness on most VHS mono machines is also good, since this frequency often falls into a frequency region which strongly interacts with the recorder's high frequency bias signal as described in the above mentioned European patent application. The first such region is around 15-20 kHz, and the second is around 29-31 kHz.

Although various different implementations of the preferred embodiment have been described, it will be appreciated that an effective audio and copy protection system could be formed by combining some or all of the features of the schemes, and switching between them either at random or on psychoacoustic-based grounds.

To summarise, the properties of the VHS Hi-Fi recording system which are exploited by the preferred embodiment of the invention are:
1. Significant noise from tape drop-outs;
2. Regular additional noise from head-switching;
3. An imperfect circuit to conceal the effects of 1. and 2.;
4. A low on-tape signal-to-noise ratio;
5. A frequency dependent compression-expansion process designed to hide these defects, which works poorly in the presence of high amplitude high frequency signals; and
6. Various AGC-like functions operating in the base-band audio and FM modulated domain.

Although, in the preferred embodiment, the combination of the effect of high frequency pulses on both the drop-out compensator and the compander circuits is relied upon, as it has been found to give the best results, it will be appreciated that the pulses could be added to the original audio signal such that only one or the other effect is used.

For example, if pulses are added to the signal so that there is no overlap between pulses and the parts of the signal that are affected by the head switching, only the operation of the compander circuit would be affected. Alternatively, a protection signal of high frequency pulses may be added to the regions of the signal where head switching occurs, but depending on the magnitude of the signal, and the operation of the compander circuit it may have little or no effect on the compression and subsequent expansion of the signal before and after recording.

A preferred circumvention device for removing the effect of the anti-copy protection signal described above will next be described.

It will be appreciated that the circumvention device must identify the position of the copy protection signal in both time and frequency domains, and remove it. The time and frequency region of signal which has been removed can then be left empty/blank, or can be replaced/patched using known audio restoration methods.

The preferred circumvention device is arranged to examine the relative or absolute signal energy in certain time and frequency regions in an attempt to identify the position of the copy protection signal.

Depending on the implementation of the copy protection, it may be trivial or difficult to identify the location of the copy protection signal itself.

In the simplest case, the circumvention device comprises a detector arranged to detect pulses in the received signal occurring at the video synchronisation rate of the recording heads in Hi-Fi recorders. The detector therefore searches for pulses that occur with a frequency of approximately 50.1 or 60.1 Hz.

If candidate pulses are found, the detector may then further process the pulses to determine their duration and frequency and confirm that they agree with those of the protection pulses defined earlier. The detector may use the fact that the pulses are intended to occur in at least partial synchronisation with the recording heads to disregard pulses that are not synchronised in this way.

Such a detector preferably comprises a filter to isolate the frequency region of interest, an envelope follower, a peak detector, a timer to measure the time between the peaks, and control logic to detect the expected peak spacing corresponding to the head switching rate.

Where the protection signal added is more complicated, such as where pulses which vary in their timing, or a pure sine wave is added, models of the likely copy protection signal, or assumptions about parameters of the likely copy protection signal, are used to make the identification more accurate. Though an "intelligent" statistical model can be used to determine the position of the copy protection, it has been found more cost effective for a human operator to search for the copy protection manually using well known spectral analysis tools, and then to hard code the parameters they discover into the circumvention device. Those skilled in the art can design and construct a device to examine certain time/frequency ranges for the presence or absence of known signals.

Where a psychoacoustic sensorial model, or recording model, has been used to determine the form of the protection signal in the first instance, then it is preferred if the circumvention device uses these or similar models to predict where the copy protection signal may have been added to aid with identifying its position.

Once identified, appropriate sections of the signal can be removed using an adaptive filter, or other processing which is easily designed by those skilled in the art. The filter or processing can be gradually switched in and out of circuit using appropriate ramp or window functions to prevent switching transients, and the characteristics of the switching rate, timing and duration can be chosen to match or exceed those in the copy protection signal itself.

Alternatively, known audio restoration methods, typically used to replace damaged or missing sections of audio by prediction from the surrounding audio signal, can be used to replace the regions from which the copy protection has been removed. The replacement step can be used in place of the removal step. Where the timing of the pulses is not detected, removal or replacement of likely frequency ranges, determined from the parameters mentioned above, can be used to remove the copy protection signal.

Additionally, the copy protection signal described can be used to provide protection against recording of the signal by digital recorders. Digital recorders not only convert the incoming analogue signal to a digital signal, before recording takes place, but most do not utilise the rotating recording head drum described. As a result, the protection signal is unlikely to have an effect on the recording or playback process itself.

However, the presence of the protection signal, or the particular form of the protection signal itself, can be used as an instruction to instruct the digital recorder not to record. A detector, such as that described above for the circumvention device, can then be provided in the digital recorder, to detect the protection signal and take action accordingly.

For example, the presence of the protection signal is preferably taken as an instruction to the digital recorder not to allow recording to take place. Thus, if the detector detects the signal, by identifying pulses occurring with at or near the synchronisation rate of the audio head drum say, recording will be prevented.

Alternatively, the location or timing, amplitude, frequency, duration, and indeed any other characteristic of the protection signal that is added may be varied to represent more complicated instructions or encode data. A digital value of one, for example, could be encoded by a particular value of any of the above attributes, with the value of zero encoded by a different, complimentary value. The data or instructions, could then carry proprietor information describing the proprietor of the signal content, licensing information, restrictions on the number of copies of a signal that can be made, the length of time for which a temporary copy can be kept, and so on.

The detector may be implemented in either hardware or software, such as in the form of a chip for installation in a digital recorder, or in the control logic of the recorder itself.

Although, the preferred embodiment of the inventions is directed to a Video Hi-Fi Recording system, it will be appreciated that any tape recording system having a plurality of switched recording heads may utilise the protection described.

The invention claimed is:

1. An apparatus to copy a received signal, comprising:
an input for receiving the signal, wherein the signal comprises an audio component;
a recording circuit configured to record the signal for later playback such that when the signal is recorded, at least the audio component of the signal is recorded with discontinuities; and
an output for outputting the protected recorded signal for playback, wherein a protection signal in the audio component of the received signal causes attempts to mask the discontinuities of the audio component to become audible on playback of the recorded signal.

2. An apparatus according to claim 1, wherein the protection signal is a pulsed protection signal.

3. An apparatus according to claim 1, wherein the protection signal comprises pulses that at least partially overlap with the discontinuities in the audio signal component.

4. An apparatus according to claim 3, wherein the protection signal pulses at a rate that is identical or close to identical with that at which the discontinuities occur.

5. An apparatus according to claim 4, wherein a rate at which the pulses occur is substantially the field synchronisation rate of a video picture.

6. An apparatus according to claim 4, wherein a rate at which the pulses are arranged to occur is 50 Hz or 60 Hz±5 Hz.

7. An apparatus according to claim 1, wherein a frequency of the protection signal is substantially at or beyond the upper end of the range of frequencies audible to the human ear.

8. An apparatus according to claim 7, wherein the frequency of the protection signal is 19.5 kHz.

9. An apparatus according to claim 8 wherein the protection signal has a magnitude between 0.05 Vrms and 2 Vrms.

10. An anti-copy signal protection method for use by a recording device in which at least an audio component of the signal is recorded with discontinuities, and in which a compensating circuit is employed by the recording device to mask the discontinuities on recording and/or playback, the method comprising adding a protection signal to the audio component of the signal that impairs the operation of the compensating circuit of the recording device such that the attempts to mask the discontinuities in the recorded signal are audible on playback of a copy.

11. The method of claim 10, wherein the protection signal is a pulsed signal.

12. The method of claim 11, comprising adding the pulsed signal such that the pulses at least partially overlap with the discontinuities in the audio signal.

13. The method of claim 12, wherein the frequency at which the pulses of the pulsed signal occur is arranged to be identical or close to identical with the frequency at which the discontinuities occur.

14. A method according to claim 12, wherein the repetition rate of the pulses is substantially the field synchronisation rate of a video picture.

15. A method according to claim 10, wherein a frequency of the protection signal is substantially at the upper end of the range of frequencies audible to the human ear.

16. The method of claim 10 wherein a signal is added to the audio component of the signal at or near an integer multiple of the line synchronisation rate of the video recorder to form protected signal, such that when the protected signal is recorded on a video recorder, one or more artifacts are produced which result in a reduced quality of the recorded signal on playback.

17. A detector for detecting an anti-copy protection signal in a received signal, the detector comprising:
  a pulse detector arranged to identify pulses occurring in an audio portion of the received signal, wherein the audio portion of the received signal is recorded with discontinuities that are masked during playback and wherein the pulses are configured to interfere with the masking of the discontinuities;
  an analyzer for determining values for one or more parameters of the pulses detected by the pulse detector;
  control logic associating different values of each parameter with a control instruction for a recording device; and
  an output for outputting a signal indicative of the control instruction associated with the values of the parameters of the analyzed pulse to the recording device.

18. The detector of claim 17 wherein the parameters include the location, the timing, the amplitude, the duration, the shape, or the frequency of the pulse.

\* \* \* \* \*